(12) United States Patent
Shelton et al.

(10) Patent No.: US 10,848,494 B2
(45) Date of Patent: Nov. 24, 2020

(54) COMPLIANCE BOUNDARIES FOR MULTI-TENANT CLOUD ENVIRONMENT

(71) Applicant: Microsoft Technology Licensing, LLC, Redmond, WA (US)

(72) Inventors: Samuel Johnson Shelton, Kirkland, WA (US); Rameshkumar Perumal, Bothell, WA (US); Liming Hong, Redmond, WA (US); Chong Chan Lyu, Bellevue, WA (US); Nakul Garg, Sammamish, WA (US); Kai Liang, Issaquah, WA (US); Marshal Ray Hagen, Kirkland, WA (US); Bin Hu, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 9 days.

(21) Appl. No.: 15/676,192

(22) Filed: Aug. 14, 2017

(65) Prior Publication Data
US 2019/0052644 A1 Feb. 14, 2019

(51) Int. Cl.
*H04L 29/06* (2006.01)
*G06F 9/50* (2006.01)
(Continued)

(52) U.S. Cl.
CPC .......... *H04L 63/102* (2013.01); *G06F 9/5077* (2013.01); *G06F 21/6218* (2013.01);
(Continued)

(58) Field of Classification Search
CPC . H04L 63/102; H04L 63/107; H04L 63/1408; H04L 63/104; H04L 63/105;
(Continued)

(56) References Cited

U.S. PATENT DOCUMENTS 8,782,795 B1 * 7/2014 Field .................... H04L 63/205
726/25
9,235,812 B2 1/2016 Scholtes
(Continued)

FOREIGN PATENT DOCUMENTS

WO 2014039772 A1 3/2014

OTHER PUBLICATIONS

"Assign eDiscovery permissions in the Office 365 Security & Compliance Center", https://support.office.com/en-gb/article/Assign-eDiscovery-permissions-in-the-Office-365-Security-Compliance-Center-5b9a067b-9d2e-4aa5-bb33-99d8c0d0b5d7, Retrieved on: Jun. 28, 2017, 9 pages.
(Continued)

Primary Examiner — Techane Gergiso (57) ABSTRACT

Aspects of the present disclosure relate to systems and methods for creating compliance boundaries. In one example, compliance boundaries may be implemented via a compliance tool. Data associated with a tenant may be segregated using a plurality of layers defining one or more compliance boundaries. In response to an action initiated by a compliance administrator using the compliance tool for accessing the data, it may be determined which data is within the one or more compliance boundaries associated with the compliance administrator. Access to the data determined to be within the one or more compliance boundaries associated with the compliance administrator may be authorized.

20 Claims, 6 Drawing Sheets

(51) Int. Cl.
*G06F 21/62* (2013.01)
*G06F 9/455* (2018.01)
*G06F 21/31* (2013.01)

(52) U.S. Cl.
CPC .......... H04L 63/104 (2013.01); H04L 63/105 (2013.01); H04L 63/107 (2013.01); H04L 63/1408 (2013.01); *G06F 21/31* (2013.01); *G06F 21/6236* (2013.01); *G06F 2009/45587* (2013.01); *G06F 2221/2111* (2013.01); *G06F 2221/2141* (2013.01)

(58) Field of Classification Search
CPC .... G06F 9/5077; G06F 21/6218; G06F 21/31; G06F 21/6236; G06F 2009/45587; G06F 2221/2111; G06F 2221/2141
See application file for complete search history.

(56) References Cited

U.S. PATENT DOCUMENTS

| | | | |
|---|---|---|---|
| 9,374,427 B2 | 6/2016 | Shekher et al. | |
| 9,514,327 B2 | 12/2016 | Ford | |
| 9,608,809 B1* | 3/2017 | Ghetti | H04L 9/083 |
| 9,967,285 B1* | 5/2018 | Rossman | G06F 16/22 |
| 10,326,845 B1* | 6/2019 | Jaeger | H04L 41/0806 |
| 2006/0235715 A1* | 10/2006 | Abrams | G06Q 40/04 705/1.1 |
| 2012/0011077 A1* | 1/2012 | Bhagat | G06F 21/554 705/317 |
| 2012/0179646 A1* | 7/2012 | Hinton | G06F 16/25 707/607 |
| 2012/0303776 A1* | 11/2012 | Ferris | H04L 29/08072 709/223 |
| 2013/0023237 A1* | 1/2013 | Meredith | H04W 12/06 455/411 |
| 2013/0036031 A1* | 2/2013 | Hutchinson | G06Q 10/10 705/30 |
| 2013/0047230 A1 | 2/2013 | Krishnan et al. | |
| 2013/0117218 A1 | 5/2013 | Fan et al. | |
| 2013/0297655 A1* | 11/2013 | Narasayya | G06F 11/3457 707/791 |
| 2014/0032228 A1 | 1/2014 | Johri et al. | |
| 2014/0173694 A1 | 6/2014 | Kranz | |
| 2014/0189124 A1 | 7/2014 | Banatwala et al. | |
| 2014/0283010 A1* | 9/2014 | Rutkowski | G06F 21/31 726/18 |
| 2014/0359594 A1 | 12/2014 | Erbe et al. | |
| 2015/0058376 A1 | 2/2015 | Soshin | |
| 2015/0200958 A1* | 7/2015 | Muppidi | H04L 63/10 726/23 |
| 2015/0249681 A1* | 9/2015 | Zhang | H04L 63/20 726/1 |
| 2015/0296016 A1* | 10/2015 | Bennett, Jr. | H04L 63/104 709/213 |
| 2015/0319160 A1* | 11/2015 | Ferguson | H04L 9/3247 726/10 |
| 2015/0381590 A1* | 12/2015 | Bosko | H04L 63/0428 713/171 |
| 2016/0080502 A1* | 3/2016 | Yadav | G06F 16/285 709/227 |
| 2016/0105456 A1* | 4/2016 | Thakkar | G06F 21/53 709/224 |
| 2016/0119285 A1 | 4/2016 | Kakhandiki et al. | |
| 2016/0156671 A1* | 6/2016 | Cabrera | H04L 63/20 726/1 |
| 2016/0164723 A1* | 6/2016 | Cimprich | H04L 41/0806 709/221 |
| 2016/0173502 A1 | 6/2016 | Statchuk | |
| 2017/0041296 A1* | 2/2017 | Ford | H04W 12/02 |
| 2017/0075922 A1* | 3/2017 | Torman | G06F 16/1805 |
| 2017/0103223 A1* | 4/2017 | Deulgaonkar | G06F 21/6218 |
| 2017/0235895 A1* | 8/2017 | Cox | G06F 40/30 705/2 |
| 2017/0272472 A1* | 9/2017 | Adhar | H04L 63/1425 |
| 2017/0318083 A1* | 11/2017 | Ignatyev | H04L 67/1023 |
| 2017/0325062 A1* | 11/2017 | Irani | H04L 67/18 |
| 2017/0353444 A1* | 12/2017 | Karangutkar | H04L 63/102 |
| 2018/0034703 A1* | 2/2018 | Anholt | H04L 41/0893 |
| 2018/0095790 A1* | 4/2018 | Pradeep | G06F 16/16 |
| 2018/0189517 A1* | 7/2018 | Larson | G06F 21/6245 |
| 2018/0357226 A1* | 12/2018 | Su | G06F 21/6245 |
| 2019/0026472 A1* | 1/2019 | Adam | G06F 21/563 |

OTHER PUBLICATIONS

"Manage eDiscovery cases in the Office 365 Security & Compliance Center", https://support.office.com/en-us/article/Manage-eDiscovery-cases-in-the-Office-365-Security-Compliance-Center-9a00b9ea-33fd-4772-8ea6-9d3c65e829e6, Retrieved on: Jun. 28, 2017, 27 pages.
Mahajan, et al., "Powerful Enterprise Search for eDiscovery and Compliance", https://www.druva.com/blog/powerful-metadata-search-ediscovery-compliance/, Published on: Apr. 25, 2017, 3 pages.
"Assign eDiscovery permissions to OneDrive for Business sites", https://support.office.com/en-us/article/Assign-eDiscovery-permissions-to-OneDrive-for-Business-sites-422858ff-917b-46d4-9e5b-3397f60eee4d, Retrieved on: Jul. 4, 2017, 11 pages.
"Set up an eDiscovery Center in SharePoint Online", https://support.office.com/en-us/article/Set-up-an-eDiscovery-Center-in-SharePoint-Online-a18f8975-aa7f-43b4-a7d6-001d14744d8e?ui=en-US&rs=en-US&ad=US, Retrieved on: Jul. 4, 2017, 10 pages.
"Configure permissions filtering for Content Search", https://support.office.com/en-us/article/Configure-permissions-filtering-for-Content-Search-1adffc35-38e5-4f7d-8495-8e0e8721f377, Retrieved on: Jul. 4, 2017, 12 pages.
"eDiscovery in Office 365", https://aka.ms/edisco, Retrieved on: Jul. 4, 2017, 12 pages.
"Permissions in the Office 365 Security & Compliance Center", https://support.office.com/en-us/article/Permissions-in-the-Office-365-Security-Compliance-Center-d10608af-7934-490a-818e-e68f17d0e9c1?ui=en-US&rs=en-US&ad=US, Retrieved on: Jul. 4, 2017, 5 pages.
"Add-RoleGroupMember", https://technet.microsoft.com/en-us/enus/library/dd638207(v=exchg.160).aspx, Retrieved on: Jul. 4, 2017, 1 page.
"Add-ComplianceCaseMember", https://technet.microsoft.com/en-us/enus/library/mt733066(v=exchg.160).aspx, Retrieved on: Jul. 4, 2017, 1 page.
"International Search Report and Written Opinion Issued in PCT Application No. PCT/US18/035936", dated Oct. 19, 2018, 20 Pages.

* cited by examiner

COMPLIANCE BOUNDARIES FOR MULTI-TENANT CLOUD ENVIRONMENT

BACKGROUND

Tenants utilizing a cloud environment, for example to store data, may span across multiple units or geographical locations, for example. As such, in a cloud environment scenario, permissions may be implemented for accessing data associated with a particular unit or geographical location. For example, permissions for accessing the data may be pre-defined for administrators and users associated with the tenant and/or data. In some cases, the data may be accessed using electronic discovery. In an electronic discovery scenario, permissions are often circumvented to allow enterprises unbound access to data to respond to requests or internal investigations, for example. In some examples, role-based access control may be used for regulating access to the data. However, the administration of role-based access control techniques is tedious, difficult and may result in access to data by a user not authorized to access the data. As such, current techniques for implementing permissions for accessing data in cloud environment via a compliance tool may be cumbersome, difficult, and inefficient, ultimately resulting in access to data by a user not authorized to access the data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to systems and methods for creating compliance boundaries. In one aspect, data associated with a tenant may be segregated using a plurality of layers defining one or more compliance boundaries. In response to an action initiated by a compliance administrator using the compliance tool for accessing the data, it may be determined which data is within the one or more compliance boundaries associated with the compliance administrator. Access to the data determined to be within the one or more compliance boundaries associated with the compliance administrator may be authorized.

In another aspect, a method for creating compliance boundaries is presented. Data associated with a tenant may be segregated using a plurality of layers defining one or more compliance boundaries. The one or more compliance boundaries may be applied to a plurality of data locations in a cloud environment and compliance work product containers. A plurality of compliance boundary attributes may be mapped to one or more compliance administrators authorized to use a compliance tool for accessing the data. A plurality of compliance boundary attributes may be mapped to one or more users associated with the data.

In yet another aspect, a method for implementing compliance boundaries via a compliance tool may be presented. Data associated with a tenant may be segregated using a plurality of layers defining one or more compliance boundaries. In response to an action initiated by a compliance administrator using the compliance tool for accessing the data, it may be determined which data is within the one or more compliance boundaries associated with the compliance administrator. Access to the data determined to be within the one or more compliance boundaries associated with the compliance administrator may be authorized.

DESCRIPTION OF THE DRAWINGS

The detailed description is made with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Aspects of the disclosure are generally directed to creating compliance boundaries for data accessed using a compliance tool. For example, data may be separated for a tenant such that users of the compliance tool can only access data within their compliance boundary. In one example, the compliance tool is an electronic discovery (e.g., eDiscovery) tool. The compliance tool may allow a compliance administrator such as a compliance manager to act on data within a tenant. The action may include searching the data, exporting the data, putting a hold on the data, and the like. In one example, a tenant includes an enterprise such as a multi-national, government agency, and the like. The data may be separated by multiple layers. For example, the data may be separated by geographical location, groups associated with the tenant (e.g., different units), compliance work product containers such as eDiscovery cases, and the like. The compliance boundaries may apply to a plurality of data locations in a cloud environment. In one example, the compliance boundaries may apply to private data locations such as Exchange mailboxes, OneDrive for business sites, Skype for business chat, and the like. In another example, the compliance boundaries may apply to shared data locations such as SharePoint, Microsoft teams, and the like. In this regard, the compliance boundaries are extensible across multiple platforms in a cloud environment. As such, creating compliance boundaries in accordance with the present disclosure facilitates safe and secure storage and access to data by limiting access to data within compliance boundaries to users and/or compliance administrators within those compliance boundaries.

As discussed above, in an electronic discovery scenario, permissions are often circumvented to allow enterprises unbound access to data to respond to requests or internal investigations, for example. In some examples, role-based access control may be used for regulating access to the data. However, the administration of role-based access control techniques is tedious, difficult and may result in access to data by a user not authorized to access the data. As such, current techniques for implementing permissions for accessing data in cloud environment via a compliance tool may be cumbersome, difficult, and inefficient, ultimately resulting in access to data by a user not authorized to access the data.

Accordingly, aspects described herein include techniques for creating compliance boundaries for data accessed using a compliance tool that are efficient, safe, and secure. For example, data associated with a tenant may be segregated using a plurality of layers defining one or more compliance boundaries. In one example, in response to an action initiated by a compliance administrator using a compliance tool for accessing the data, the data that is within the one or more compliance boundaries associated with the compliance administrator may be determined. For example, at least one rule may be executed that compares one or more compliance boundary attributes mapped to the compliance administrator with one or more compliance boundary attributes mapped to users associated with the data. In this regard, it is determined which data is within the one or more compliance boundaries associated with the compliance administrator. As such, access to the data determined to be within the one or more compliance boundaries associated with the compliance administrator may be authorized for the compliance administrator. As such, a technical effect that may be appreciated is that by limiting access to data within compliance boundaries to compliance administrators authorized to access the data within the compliance boundary, process and data security is improved. In particular, the present disclosure overcomes a problem specifically arising in the realm of process and data security and is applied to the specific application of compliance tools.

In one example, a first set of users within a compliance boundary of the one or more compliance boundaries has a first compliance boundary attribute set. In another example, a second set of users within the compliance boundary has a second compliance boundary attribute set. In this regard, multiple sets of users within different compliance boundary attribute sets may access the same data within a compliance boundary. The one or more compliance boundaries may be applied to a plurality of data locations in a cloud environment and compliance work product containers. In this regard, the compliance tool is extensible across the plurality of data locations in the cloud environment. As such, another technical effect that may be appreciated is that by extending the compliance tool across a plurality of data locations (e.g., platforms) in a cloud environment, less computing resources are utilized. For example, by only requiring the execution of a single compliance tool across multiple platforms (e.g., instead of requiring each platform to have its own compliance tool), at the very least, processor load may be reduced, memory may be conserved, and network bandwidth usage may be reduced.

Figure 1:
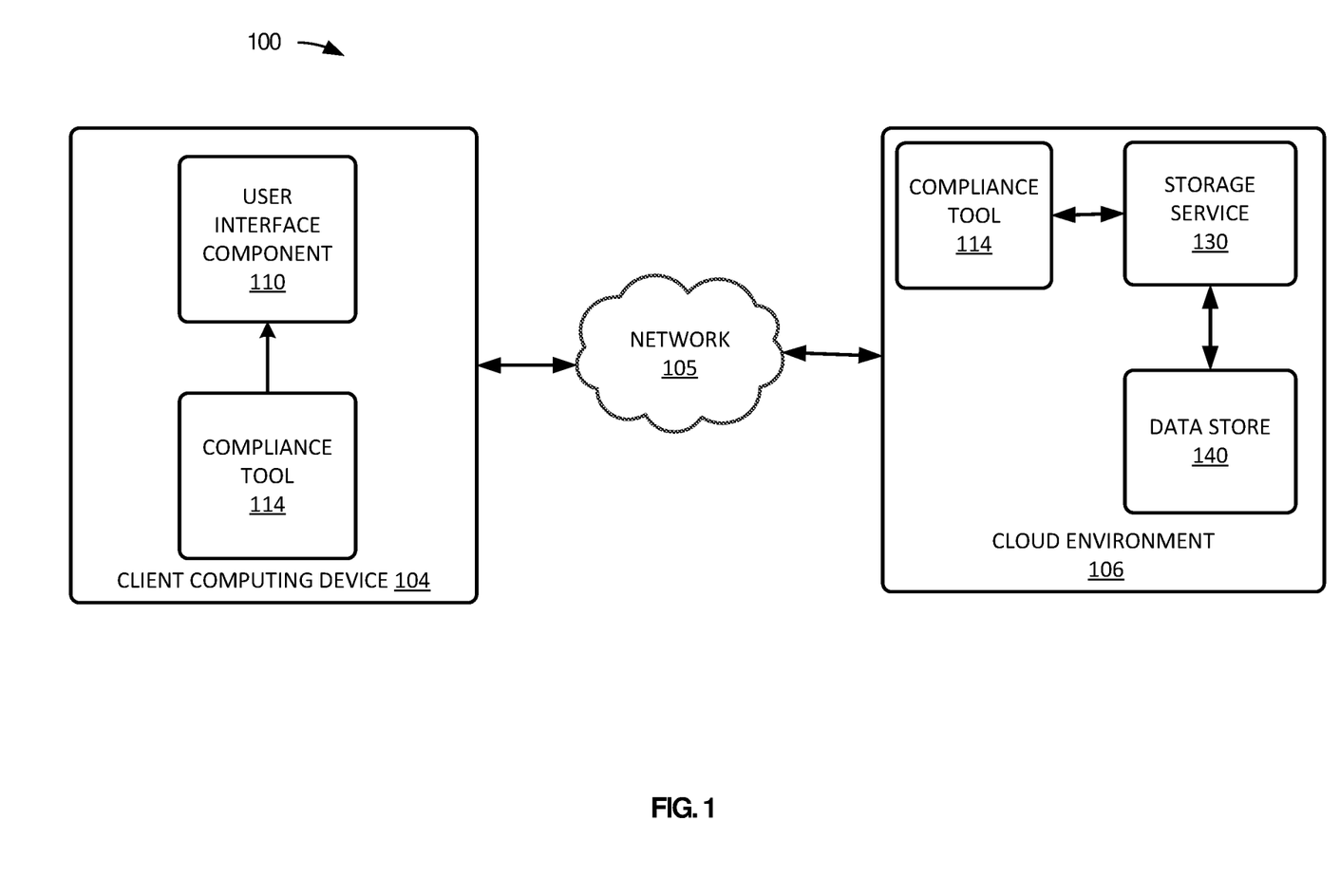
FIG. 1 illustrates an exemplary compliance boundary system for creating compliance boundaries, according to an example aspect.

Referring now to the drawings, in which like numerals represent like elements through the several figures, aspects of the present disclosure and the exemplary operating environment will be described. With reference to FIG. 1, one aspect of a compliance boundary system 100 for creating compliance boundaries is illustrated. The compliance boundary system 100 may include a client computing device 104 and a cloud environment 106. In aspects, the compliance boundary system 100 may be implemented on the client computing device 104. In a basic configuration, the client computing device 104 is a handheld computer having both input elements and output elements. The client computing device 104 may be any suitable computing device for implementing the compliance boundary system 100 for creating compliance boundaries. For example, the client computing device 104 may be at least one of: a mobile telephone; a smart phone; a tablet; a phablet; a smart watch; a wearable computer; a personal computer; a desktop computer; a laptop computer; a gaming device/computer (e.g., Xbox); a television; and etc. This list is exemplary only and should not be considered as limiting. Any suitable client computing device 104 for implementing the compliance boundary system 100 for creating compliance boundaries may be utilized.

In aspects, the compliance boundary system 100 may be implemented in the cloud environment 106. The cloud environment 106 may provide data to and from the client computing device 104 through a network 105. In aspects, the compliance boundary system 100 may be implemented in more than one cloud environment 106, such as a plurality of cloud environments 106. As discussed above, the cloud environment 106 may provide data to and from the client computing device 104 through the network 105. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums. In another aspect, the compliance boundary system 100 may be implemented as a web-based application. In one example, the web-based application may include any client-server software application where the client (e.g., user interface) runs in a web-browser and/or any component capable of rendering HTML, Flash, Silverlight, and the like.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval, and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The various components may be implemented using hardware, software, or a combination of hardware and software. In aspects, the client computing device 104 may include a user interface component 110 and a compliance tool 114. The user interface component 110 may facilitate interaction with the compliance tool 114 and/or access to data. For example, the user interface component 110 may display data determined to be within one or more compliance boundaries associated with a compliance administrator in the compliance tool 114. In one example, a compliance administrator may include a compliance manager such as an electronic discovery manager. The compliance manager may initiate an action using the compliance tool 114. For example, the compliance manager may perform a search on data, export data, or hold data using the compliance tool 114. In this regard, the compliance manager may initiate an action on data, view data, interact with data, and the like that is within one or more compliance boundaries associated with the compliance manager. The one or more compliance boundaries may include at least a geographical location compliance boundary, a group compliance boundary, and a case compliance boundary. As such, in one example, the compliance manager may initiate an action on data, view data, interact with data, and the like, that is within at least one of and/or all of a geographical location, a group, and a case associated with the compliance manager.

In one example, initiating an action may include touching, clicking on, audibly referencing, pointing to, selecting, and/or any indication of an interest in or selection of an action icon, graphic, and the like displayed in the user interface to the compliance tool 114 for initiating the action. For example, the action icon, graphic, and the like may include a search icon/graphic, a hold icon/graphic, an export icon/graphic, and the like. As such, the compliance tool 114 may facilitate the initiation of an action for at least interacting with, accessing, and viewing data. In one example, the compliance tool 114 is an electronic discovery (e.g., eDiscovery) tool. The electronic discovery tool may be used to manage electronic data in an electronic discovery process, for example. In another example, the compliance tool 114 may facilitate segregating data associated with a tenant. For example, a plurality of compliance boundary attributes may be mapped to one or more compliance administrators authorized to use the compliance tool 114 for accessing the data. In another example, a plurality of compliance boundary attributes may be mapped to one or more users associated with the data. The compliance boundary attributes may include a geographical location value, a group value, a case value, a compliance work product value, a site value, among others. As such, the compliance boundary attributes may create a plurality of layers defining one or more compliance boundaries.

In some aspects, the cloud environment 106 may include the compliance tool 114, a storage service 130, and a data store 140. As discussed above, the compliance tool 114 may facilitate the initiation of an action for at least interacting with, accessing, and viewing data and/or segregating data. In some examples, when the compliance tool 114 is located at the cloud environment 106, the compliance tool 114 may communicate with the storage service 130. For example, the compliance tool 114 may send a request to the storage service 130 for data stored at the storage service 130 and/or the data store 140. In one example, the compliance tool 114 may send a request to the storage service 130 in response to the initiation of an action using the compliance tool 114. In another example, the compliance tool 114 may receive data from the storage service 130. In another example, the compliance tool 114 may send the received data to the client computing device 104 for display within the compliance tool 114. In this regard, the user interface component 110 and/or the compliance tool 114 may display the data received in response to an initiated action in the user interface. In some examples, the compliance tool 114 is part of and/or located at the client computing device 104. In other examples, the compliance tool 114 is part of and/or located at the cloud environment 106. In other examples, one or more components of the compliance tool 114 are located at the client computing device 104 and one or more components of the compliance tool 114 are located at the cloud environment 106 such that the compliance tool 114 is located at both the client computing device 104 and the cloud environment 106.

In aspects, the storage service 130 may be configured to store, manage, and access data and/or information associated with the compliance boundary system 100. For example, the storage service 130 may store one or more email, documents, files, chat conversation, cases, and the like within the data store 140. In one example, data store 140 may be part of and/or located at the storage service 130. In another example, data store 140 may be a separate component and/or may be located separate from the storage service 130. It is appreciated that although one cloud environment 106 is illustrated in FIG. 1, the compliance boundary system 100 may include a plurality of cloud environments 106 with a plurality of storage services 130 and a plurality of data stores 140. In some cases, the cloud environment 106 may include a plurality of storage services 130 and a plurality of data stores 140. For example, the plurality of storage services 130 may include at least private data locations and shared data locations such as file storage providers, external activity services and document editing clients. In one example, the storage service 130 may include private data locations such as Exchange, OneDrive, Skype, and the like. In another example, the storage service 130 may include shared storage locations such as SharePoint, Microsoft Teams, and the like.

In one example, the user interface component 110 may be a touchable user interface that is capable of receiving input via contact with a screen of the client computing device 104, thereby functioning as both an input device and an output device. For example, content may be displayed, or output, on the screen of the client computing device 104 and input may be received by contacting the screen using a stylus or by direct physical contact of a user, e.g., touching the screen. Contact may include, for instance, tapping the screen, using gestures such as swiping or pinching the screen, sketching on the screen, etc.

In another example, the user interface component 110 may be a non-touch user interface. In one case, a tablet device, for example, may be utilized as a non-touch device when it is docked at a docking station (e.g., the tablet device may include a non-touch user interface). In another case, a desktop computer may include a non-touch user interface. In this example, the non-touchable user interface may be capable of receiving input via contact with a screen of the client computing device 104, thereby functioning as both an input device and an output device. For example, content may be displayed, or output, on the screen of the client computing device 104 and input may be received by contacting the screen using a cursor, for example. In this regard, contact may include, for example, placing a cursor on the non-touchable user interface using a device such as a mouse.

Figure 2:
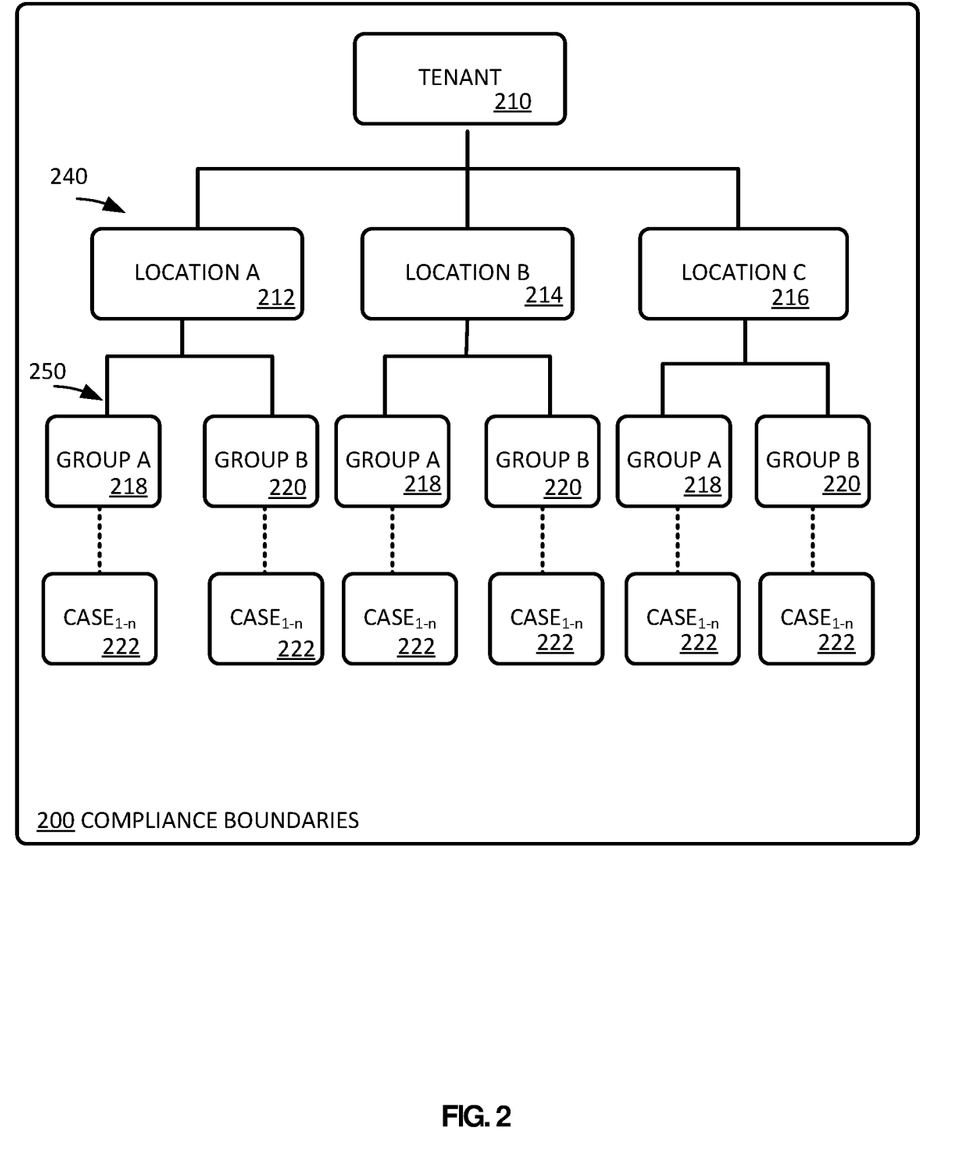
FIG. 2 illustrates an exemplary application of compliance boundaries for data accessed using a compliance tool, according to an example aspect.

With reference now to FIG. 2 an exemplary application 200 of compliance boundaries for data accessed using a compliance tool (e.g., such as the compliance tool 114 described relative to FIG. 1), according to an example aspect is illustrated. As illustrated in FIG. 2, the application 200 of compliance boundaries is illustrated for a tenant 210. The tenant 210 may include a multi-national enterprise, a government agency, and the like. As discussed herein, data associated with the tenant 210 may be segregated using a plurality of layers defining one or more compliance boundaries. As such, a first layer 240 of the plurality of layers defines a geographical location compliance boundary. In the example illustrated in FIG. 2, the geographical location compliance boundary includes location A 212, location B 214, and location C 216. Location A 212, location B 214, and location C 216 may include any geographical location boundaries. For example, location A 212 may include the west coast of the United States, location B 214 may include the central United States, and location C 216 may include the east coast of the United States. In another example, location A 212 may include the United States, location B 214 may include Europe, and location C 216 may include China. In yet another example, location A 212 may include a country within Europe such as Germany, location B 214 may include a country within Europe such as Italy, and location C 216 may include a country within Europe such as France.

As such, data associated with the tenant 210 may be segregated by geographical locations (e.g., location A 212, location B 214, location C 216). In this regard, data associated with a user who lives in location A 212 may be segregated into the location A 212 compliance boundary. In another example, data associated with a user who lives in location B 214 may be segregated into the location B 214 compliance boundary. In yet another example, data associated with a user who lives in location C 216 may be segregated into the location C 216 compliance boundary. In another aspect, a compliance administrator who lives in location A 212 may only have access to data in the location A 212 compliance boundary. In another example, a compliance administrator who lives in location B 214 may only have access to data in the location B 214 compliance boundary. In yet another example, a compliance administrator who lives in location C 216 may only have access to data in the location C 216 compliance boundary. Any geographical location compliance boundary may be used in accordance with the present disclosure. Furthermore, while FIG. 2 illustrates three geographical locations, it is respectfully submitted that any number of geographical locations (e.g., geographical location compliance boundaries) may be used in accordance with the present disclosure.

As illustrated in FIG. 2, a second layer 250 of the plurality of layers defines a group compliance boundary. In the example illustrated in FIG. 2, the group compliance boundary includes group A 218 and group B 220. Group A 218 and group B 220 may include any group compliance boundaries. For example, Group A 218 and group B 220 may include departments within the tenant 210 such as a litigation, an investigation, a financial, a human resources department, and the like. Group A 218 and group B 220 may include any number and/or type of departments within the tenant 210. In another example, group A 218 and group B 220 may include units of a government. For example, group A 218 and group B 220 may include a fire department, a police department, a mayor department, and the like. In this example, group A 218 and group B 220 may include units associated with a state government.

As such, data associated with the tenant 210 may be segregated by groups (e.g., group A 218, group B 220). In this regard, data associated with a user who belongs to group A may be segregated into the group A 218 compliance boundary. In another example, data associated with a user who belongs to group B 220 may be segregated into the group B 220 compliance boundary. In another aspect, a compliance administrator who belongs to group A 218 may only have access to data in the group A 218 compliance boundary. In another example, a compliance administrator who belongs to group B 220 may only have access to data in the group B 220 compliance boundary. In this regard, as illustrated in FIG. 2, the data associated with the tenant 210 may be segregated using a plurality of layers (e.g., at least two layers) defining one or more compliance boundaries (e.g., the geographical location compliance boundary and the group compliance boundary). As illustrated in FIG. 2, in one example, each geographical location compliance boundary may include the same groups a second layer 250 defining the group compliance boundary. In another example, the geographical location compliance boundaries may include different group compliance boundaries. In yet another example, the geographical location compliance boundaries may include some of the same group compliance boundaries and some different group compliance boundaries. Any group compliance boundary may be used in accordance with the present disclosure. Furthermore, while FIG. 2 illustrates two groups within each geographical location compliance boundary, it is respectfully submitted that any number of groups (e.g., groups compliance boundaries) may be used in accordance with the present disclosure.

As illustrated in FIG. 2, group A 218 and group B 220 include cases$_{1-n}$ 222. For example, cases (e.g., eDiscovery cases) that are assigned to group A 218 and group B 220 (and every group within the geographical location compliance boundaries) may be stored in compliance work product containers. As such, users (e.g., compliance administrators/managers) associated with (e.g. mapped to) group A 218 may have access to cases$_{1-n}$ 222 within group A 218. In another example, users (e.g., compliance administrators/managers) associated with (e.g. mapped to) group B 220 may have access to cases$_{1-n}$ 222 within group B 220. In some examples, users associated with group A 218 may also be associated with group B 220. In this regard, some users may have access to data and/or cases 222 in both the group A 218 compliance boundary and the group B 220 compliance boundary. In some examples, users associated with group A 218 may have access to only some cases$_{1-n}$ 222 within the group A 218 compliance boundary. In another example, users associated with group B 220 may have access to only some cases$_{1-n}$ 222 within the group B 220 compliance boundary. In one example, the cases$_{1-n}$ 222 are a third layer of the plurality of layers defining one or more compliance boundaries.

Figure 3:
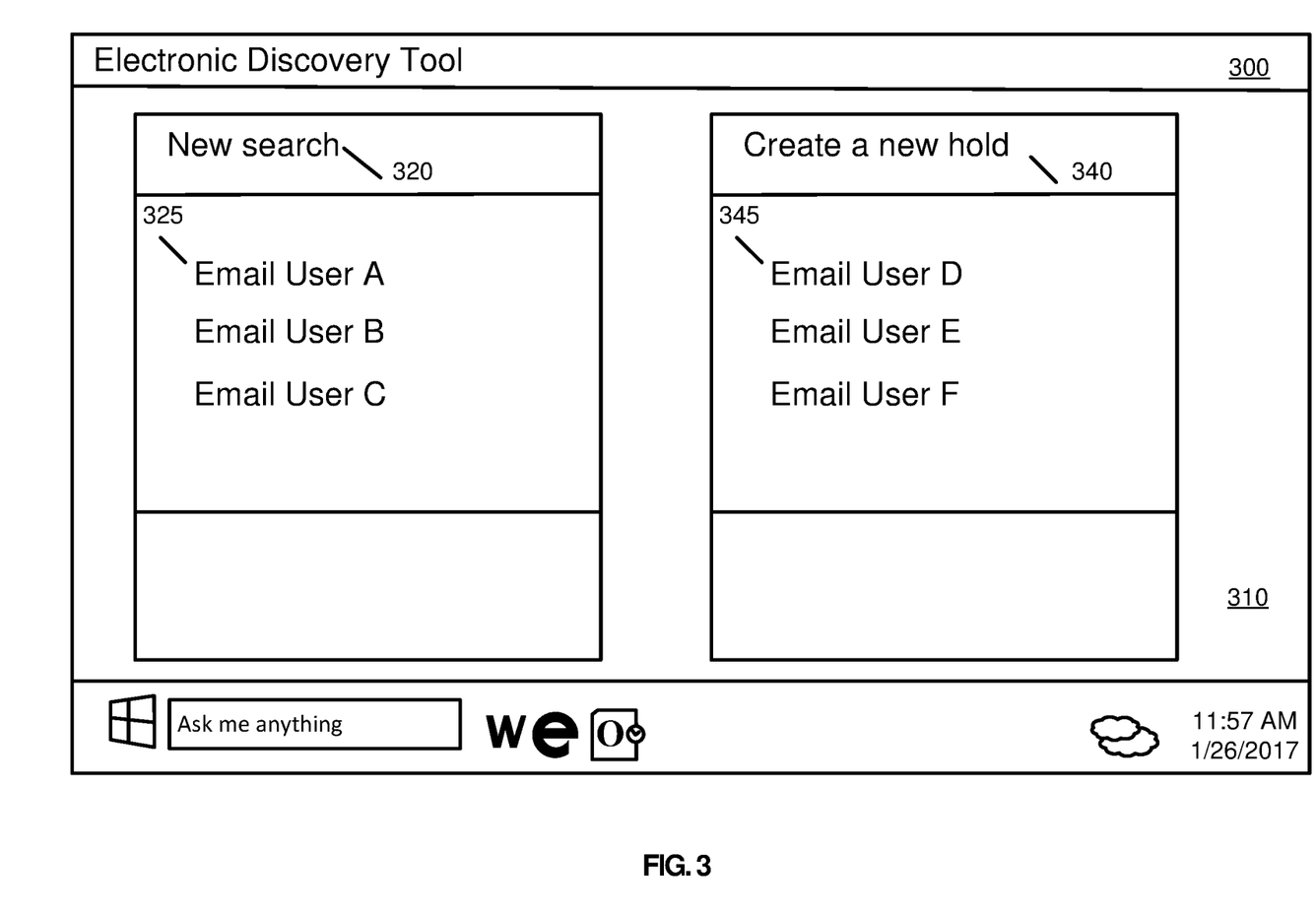
FIG. 3 illustrates one view of a compliance tool for accessing data, according to an example aspect.

Referring now to FIG. 3, one view of a compliance tool 300 for accessing data displayed on a user interface 310 of the client computing device 104, such as a desktop computer, tablet computer or a mobile phone, for example, is shown. The exemplary compliance tool, as shown in FIG. 3, is an electronic discovery tool. The electronic discovery tool 300 may be used to manage electronic data in an electronic discovery process, for example. The electronic discovery tool 300 may facilitate the initiation of an action for at least interacting with, accessing, and viewing data and/or segregating data. In this regard, FIG. 3 illustrates a search action 320 and a hold action 340 that may be initiated using the electronical discovery tool 300. The search action may include performing a search on data across a plurality of data locations in a cloud environment and compliance work product containers, as discussed herein. The hold action may include placing a hold on data across a plurality of data locations in a cloud environment and compliance work product containers, as discussed herein.

For example, in response to an action initiated with respect to the search action 320, the electronic discovery tool 300 may determine the data that is within the one or more compliance boundaries associated with the compliance administrator who initiated the new search action 320. In the example illustrated in FIG. 3, the action initiated includes a new search for emails associated with users of a tenant. In the example illustrated in FIG. 3, the compliance administrator who initiated the search action 320 is authorized access to emails 325 of user A, user B, and user C as the electronic discovery tool 300 determined that emails 325 of user A, user B, and user C are within the one or more compliance boundaries associated with the compliance administrator who initiated the action.

In another example, in response to an action initiated with respect to the create a new hold action 340, the electronic discovery tool 300 may determine the data that is within the one or more compliance boundaries associated with the compliance administrator who initiated the create a new hold action 340. In the example illustrated in FIG. 3, the action initiated includes placing a hold on emails associated with users of a tenant. In the example illustrated in FIG. 3, the compliance administrator who initiated the hold action 340 is authorized access to emails 345 of user D, user E, and user F as the electronic discovery tool 300 determined that emails 345 of user D, user E, and user F are within the one or more compliance boundaries associated with the compliance administrator who initiated the action. As such, the compliance administrator authorized access to emails 345 of user D, user E, and user F may place a hold on one or more of emails 345 of user D, user E, and user F.

While the search action 320 and the hold action 340 that may be initiated using the electronical discovery tool 300 are illustrated in FIG. 3, it is appreciated that any actions discussed herein relative to the present disclosure may be initiated using the electronic discovery tool 300. Furthermore, the compliance administrator who initiates the action is only authorized access to data within the one or more compliance boundaries associated with the compliance manager who initiates the action.

Figure 4:
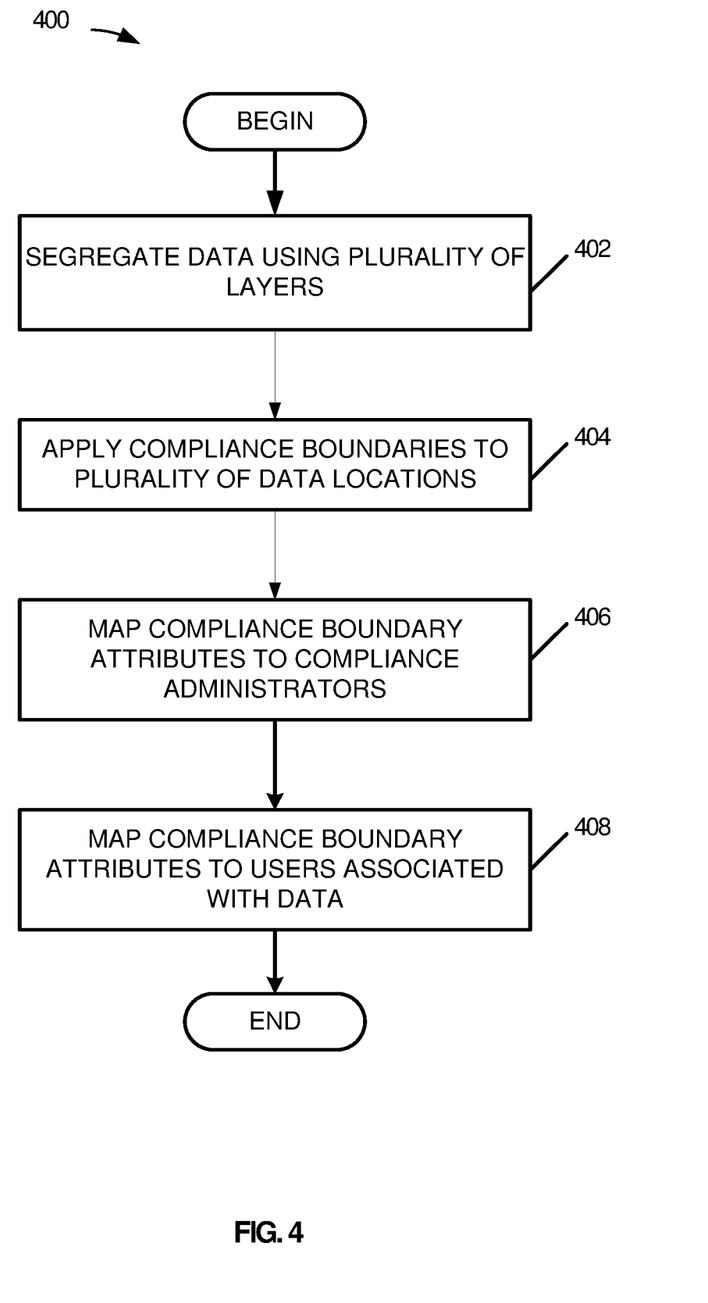
FIG. 4 illustrates an exemplary method for creating compliance boundaries, according to an example aspect.

Referring now to FIG. 4, an exemplary method 400 for creating compliance boundaries, according to an example aspect is shown. Method 400 may be implemented on a computing device or a similar electronic device capable of executing instructions through at least one processor. Method 400 may begin at operation 402, where data associated with a tenant is segregated using a plurality of layers defining one or more compliance boundaries. The tenant may include an enterprise such as a multi-national enterprise, a government agency, and the like. In one example, the first layer of the plurality of layers defines a geographical location compliance boundary. In another example, the second layer of the plurality of layers defines a group compliance boundary. In yet another example, the third layer of the plurality of layers defines a case compliance boundary. Any number of layers may be used to define one or more compliance boundaries. In some cases, the one or more compliance boundaries include at least one of a geographical location, a group, and a case.

When data associated with a tenant is segregated using a plurality of layers defining one or more compliance boundaries, flow proceeds to operation 404 where the one or more compliance boundaries are applied to a plurality of data locations in a cloud environment and compliance work product containers. In one example, the plurality of data locations in the cloud environment include private data locations and shared data locations. The private data locations may include data storage services such as Exchange, OneDrive, Skype, and the like. The shared data locations may include data storage services such as SharePoint, Microsoft Teams, and the like. In one example, the compliance work product containers include electronic discovery cases. As such, the one or more compliance boundaries apply to data stored across multiple locations and across multiple platforms.

At operation 406 a plurality of compliance boundary attributes are mapped to one or more compliance administrators authorized to use a compliance tool for accessing the data. In one example, the compliance tool is extensible across the plurality of data locations in the cloud environment. In one example, the compliance tool is an electronic discovery tool for managing electronic data in an electronic discovery process. In one example, the compliance administrator is an electronic discovery manager. Mapping the plurality of compliance boundary attributes to one or more compliance administrators authorized to use the compliance tool for accessing the data may include assigning compliance boundary attribute values to the one or more compliance administrators. For example, a compliance administrator may be assigned a plurality of compliance boundary attribute values (e.g., a compliance boundary attribute set). The compliance boundary attribute values may include values associated with the one or more compliance boundaries. For example, a compliance boundary attribute value for the geographical location compliance boundary may include the geographical location associated with the compliance administrator who is assigned the compliance boundary attribute value. In another example, the compliance boundary attribute value for the group location compliance boundary may include one or more groups associated with the compliance administrator who is assigned the compliance boundary attribute value. In yet another example, the compliance boundary attribute value for the case compliance boundary may include one or more cases associated with the compliance manager who is assigned the compliance boundary attribute value. In this regard, the compliance boundary attribute values may include values defining geographical locations, groups, cases, data locations, data storage services, and the like.

At operation 408 a plurality of compliance boundary attributes are mapped to one or more users associated with the data. Mapping the plurality of compliance boundary attributes to one or more users associated with the data may include assigning compliance boundary attribute values to the one or more users. For example, a user associated with the data may be assigned a plurality of compliance boundary attribute values (e.g., a compliance boundary attribute set). The compliance boundary attribute values may include values associated with the one or more compliance boundaries. For example, a compliance boundary attribute value for the geographical location compliance boundary may include the geographical location associated with the user who is assigned the compliance boundary attribute value. In another example, the compliance boundary attribute value for the group location compliance boundary may include one or more groups associated with the user who is assigned the compliance boundary attribute value. In yet another example, the compliance boundary attribute value for the case compliance boundary may include one or more cases associated with the user who is assigned the compliance boundary attribute value. In this regard, the compliance boundary attribute values may include values defining geographical locations, groups, cases, data locations, data storage services, and the like.

Figure 5:
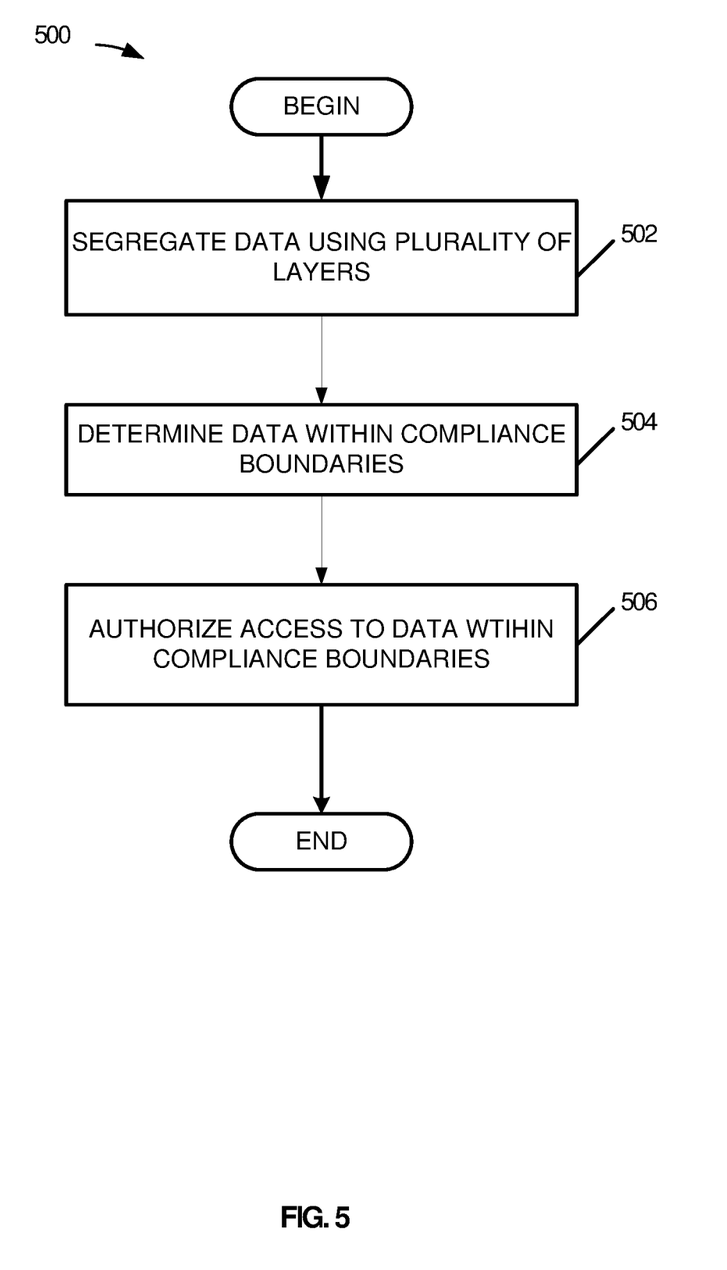
FIG. 5 illustrates an exemplary method for implementing compliance boundaries via a compliance tool, according to an example aspect.

Referring now to FIG. 5, an exemplary method 500 for implementing compliance boundaries via a compliance tool, according to an example aspect is shown. Method 500 may be implemented on a computing device or a similar electronic device capable of executing instructions through at least one processor. Method 500 may begin at operation 502, where data associated with a tenant is segregated using a plurality of layers defining one or more compliance boundaries. The tenant may include an enterprise such as a multi-national enterprise, a government agency, and the like. In one example, the first layer of the plurality of layers defines a geographical location compliance boundary. In another example, the second layer of the plurality of layers defines a group compliance boundary. In yet another example, the third layer of the plurality of layers defines a case compliance boundary. Any number of layers may be used to define one or more compliance boundaries. In some cases, the one or more compliance boundaries include at least one of a geographical location, a group, and a case.

When data associated with a tenant is segregated using a plurality of layers defining one or more compliance boundaries, flow proceeds to operation 504 where it is determined which data is within the one or more compliance boundaries associated with the compliance administrator. In one example, the data within the one or more compliance boundaries associated with the compliance administrator is determined in response to an action initiated by a compliance administrator using the compliance tool for accessing the data. In this regard, determining the data within the one or more compliance boundaries associated with the compliance administrator is executed at run-time (e.g., in real-time as the action is initiated). In one example, determining the data that is within the one or more compliance boundaries associated with the compliance administrator comprises executing at least one rule that compares one or more compliance boundary attributes mapped to the compliance administrator with one or more compliance boundary attributes mapped to users associated with the data. When a compliance boundary attribute value mapped to the compliance administrator matches a compliance boundary attribute value mapped to one or more users associated with the data, the compliance administrator is authorized access to the data associated with the one or more users having a matching value. As such, executing the at least one rule results in determining the data that is within the one or more compliance boundaries associated with the compliance administrator. In one example, the action includes at least one of a search, a hold and an export. The search action may include performing a search on data across a plurality of data locations in a cloud environment and compliance work product containers, as discussed herein. The hold action may include placing a hold on data across a plurality of data locations in a cloud environment and compliance work product containers, as discussed herein. The export action may include exporting data to another data location within the cloud environment and/or another compliance work product container.

When it is determined which data is within the one or more compliance boundaries associated with the compliance administrator, flow proceeds to operation 506 where access to the data determined to be within the one or more compliance boundaries associated with the compliance administrator is authorized for the compliance administrator. In one example, authorizing access to the data determined to be within the one or more compliance boundaries associated with the compliance administrator includes sending the data determined to be within the one or more compliance boundaries associated with the compliance administrator to a client computing device for display in a user interface to the compliance tool. In this regard, the compliance administrator can access, view, interact with the data within her compliance boundaries using the compliance tool.

Figure 6:
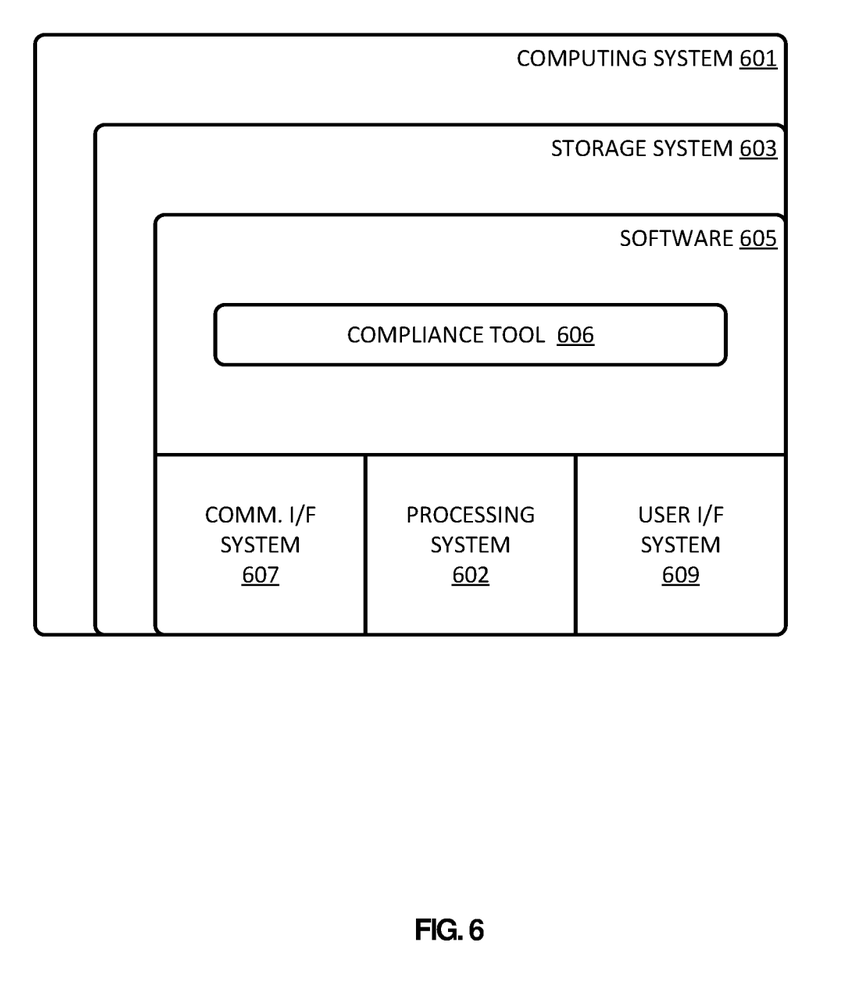
FIG. 6 illustrates a computing system suitable for implementing the enhanced compliance boundary technology disclosed herein, including any of the environments, architectures, elements, processes, user interfaces, and operational scenarios and sequences illustrated in the Figures and discussed below in the Technical Disclosure.

FIG. 6 illustrates computing system 601 that is representative of any system or collection of systems in which the various applications, services, scenarios, and processes disclosed herein may be implemented. Examples of computing system 601 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 601 may be implemented as a single apparatus, system, or device or may be implemented in a distributed manner as multiple apparatuses, systems, or devices. Computing system 601 includes, but is not limited to, processing system 602, storage system 603, software 605, communication interface system 607, and user interface system 609. Processing system 602 is operatively coupled with storage system 603, communication interface system 607, and user interface system 609.

Processing system 602 loads and executes software 605 from storage system 603. Software 605 includes compliance tool 606, which is representative of the compliance tool discussed with respect to the preceding FIGS. 1-5, including electronic discovery tools described herein. When executed by processing system 602 to enhance data security, software 605 directs processing system 602 to operate as described herein for at least the various processes, operational scenarios, and sequences discussed in the foregoing implementations. Computing system 601 may optionally include additional devices, features, or functionality not discussed for purposes of brevity.

Referring still to FIG. 6, processing system 602 may comprise a micro-processor and other circuitry that retrieves and executes software 605 from storage system 603. Processing system 602 may be implemented within a single processing device, but may also be distributed across multiple processing devices or sub-systems that cooperate in executing program instructions. Examples of processing system 602 include general purpose central processing units, application specific processors, and logic devices, as well as any other type of processing device, combinations, or variations thereof.

Storage system 603 may comprise any computer readable storage media readable by processing system 602 and capable of storing software 605. Storage system 603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 603 may also include computer readable communication media over which at least some of software 605 may be communicated internally or externally. Storage system 603 may be implemented as a single storage device, but may also be implemented across multiple storage devices or sub-systems co-located or distributed relative to each other. Storage system 603 may comprise additional elements, such as a controller, capable of communicating with processing system 602 or possibly other systems.

Software 605 may be implemented in program instructions and among other functions may, when executed by processing system 602, direct processing system 602 to operate as described with respect to the various operational scenarios, sequences, and processes illustrated herein. For example, software 605 may include program instructions for implementing enhanced compliance boundary security.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 605 may include additional processes, programs, or components, such as operating system software, virtual machine software, or other application software, in addition to or that include compliance tool 606. Software 605 may also comprise firmware or some other form of machine-readable processing instructions executable by processing system 602.

In general, software 605 may, when loaded into processing system 602 and executed, transform a suitable apparatus, system, or device (of which computing system 601 is representative) overall from a general-purpose computing system into a special-purpose computing system customized to facilitate enhanced compliance boundary security. Indeed, encoding software 605 on storage system 603 may transform the physical structure of storage system 603. The specific transformation of the physical structure may depend on various factors in different implementations of this description. Examples of such factors may include, but are not limited to, the technology used to implement the storage media of storage system 603 and whether the computer-storage media are characterized as primary or secondary storage, as well as other factors.

For example, if the computer readable storage media are implemented as semiconductor-based memory, software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 607 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 609 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 609. In some cases, the input and output devices may be combined in a single device, such as a display capable of displaying images and receiving touch gestures. The aforementioned user input and output devices are well known in the art and need not be discussed at length here.

User interface system 609 may also include associated user interface software executable by processing system 602 in support of the various user input and output devices discussed above. Separately or in conjunction with each other and other hardware and software elements, the user interface software and user interface devices may support a graphical user interface, a natural user interface, or any other type of user interface.

Communication between computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Among other examples, the present disclosure presents systems comprising one or more computer readable storage media; and program instructions stored on the one or more computer readable storage media that, when executed by at least one processor, cause the at least one processor to at least: segregate data associated with a tenant using a plurality of layers defining one or more compliance boundaries; in response to an action initiated by a compliance administrator using a compliance tool for accessing the data, determine the data that is within the one or more compliance boundaries associated with the compliance administrator; and authorize access to the data determined to be within the one or more compliance boundaries associated with the compliance administrator. In further examples, a first set of users within a compliance boundary of the one or more compliance boundaries has a first compliance boundary attribute set, and wherein a second set of users within the compliance boundary has a second compliance boundary attribute set. In further examples, the program instructions, when executed by the at least one processor, further cause the at least one processor to apply the one or more compliance boundaries to a plurality of data locations in a cloud environment and compliance work product containers. In further examples, the compliance tool is extensible across the plurality of data locations in the cloud environment. In further examples, to determine the data that is within the one or more compliance boundaries associated with the compliance administrator the program instructions, when executed by the at least one processor, further cause the at least one processor to execute at least one rule that compares one or more compliance boundary attributes mapped to the compliance administrator with one or more compliance boundary attributes mapped to users associated with the data.

Further aspects disclosed herein provide an exemplary computer-implemented method for creating compliance boundaries, the method comprising: segregating data associated with a tenant using a plurality of layers defining one or more compliance boundaries; applying the one or more compliance boundaries to a plurality of data locations in a cloud environment and compliance work product containers; mapping a plurality of compliance boundary attributes to one or more compliance administrators authorized to use a compliance tool for accessing the data; and mapping a plurality of compliance boundary attributes to one or more users associated with the data. In further examples, the first layer of the plurality of layers defines a geographical location compliance boundary. In further examples, the second layer of the plurality of layers defines a group compliance boundary. In further examples, the plurality of data locations in the cloud environment include private data locations and shared data locations. In further examples, the compliance work product containers include electronic discovery cases. In further examples, the compliance tool is extensible across the plurality of data locations in the cloud environment. In further examples, the compliance tool is an electronic discovery tool. In further examples, the compliance administrator is an electronic discovery manager.

Additional aspects disclosed herein provide an exemplary an exemplary computer-implemented method for implementing compliance boundaries via a compliance tool, the method comprising: segregating data associated with a tenant using a plurality of layers defining one or more compliance boundaries; in response to an action initiated by a compliance administrator using the compliance tool for accessing the data, determining the data that is within the one or more compliance boundaries associated with the compliance administrator; and authorizing access to the data determined to be within the one or more compliance boundaries associated with the compliance administrator. In further examples, the one or more compliance boundaries include at least one of a geographical location, a group, and a case. In further examples, the action includes at least one of a search, a hold and an export. In further examples, authorizing access to the data determined to be within the one or more compliance boundaries associated with the compliance administrator comprises sending the data determined to be within the one or more compliance boundaries associated with the compliance administrator to a client computing device for display in a user interface to the compliance tool. In further examples, the compliance tool is an electronic discovery tool. In further examples, the compliance administrator is an electronic discovery manager. In further examples, determining the data that is within the one or more compliance boundaries associated with the compliance administrator comprises executing at least one rule that compares one or more compliance boundary attributes mapped to the compliance administrator with one or more compliance boundary attributes mapped to users associated with the data.

Techniques for creating compliance boundaries are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of compliance boundary systems that execute in conjunction with a compliance tool application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A computer-implemented method for automatically creating compliance boundaries to control access to data stored in a multi-tenant cloud environment, the method comprising:
    segregating data associated with a tenant stored in the multi-tenant cloud environment using multiple hierarchical layers, including a first layer defining a first compliance boundary and a second layer defining a second compliance boundary;
    applying the first compliance boundary to a first data platform in a cloud environment and at least one compliance work product container;
    mapping a first compliance boundary attribute to a compliance administrator authorized to use a compliance tool and to an account associated with the data, wherein the first compliance boundary attribute defines access to the data at the first layer;
    applying the second compliance boundary to a second data platform in the cloud environment and the at least one compliance work product container; and
    mapping a second compliance boundary attribute to the compliance administrator and the account associated with the data, wherein the second compliance boundary attribute defines access to the data at the second layer.

2. The computer-implemented method of claim 1, wherein the first compliance boundary defines a geographical location compliance boundary.

3. The computer-implemented method of claim 1, wherein the second compliance boundary defines a group compliance boundary.

4. The computer-implemented method of claim 1, wherein the first data platform includes at least one of at least one private data location and at least one shared data location.

5. The computer-implemented method of claim 1, wherein the at least one compliance work product container includes at least one electronic discovery case.

6. The computer-implemented method of claim 1, wherein the compliance tool is extensible across the first data platform and the second data platform.

7. The computer-implemented method of claim 1, wherein the compliance tool is an electronic discovery tool.

8. The computer-implemented method of claim 1, wherein the compliance administrator is an electronic discovery manager.

9. A system comprising:
    at least one non-transitory computer readable storage media; and
    program instructions stored on the at least one non-transitory computer readable storage media that, when executed by at least one processor, cause the at least one processor to at least:
    segregate data associated with a tenant using a plurality of layers, including a first layer defining a first compliance boundary and a second layer defining a second compliance boundary;
    apply the first compliance boundary to a first data platform in a cloud environment and a compliance work product container;
    map a first compliance boundary attribute to a compliance administrator authorized to use a compliance tool and to an account associated with the data, wherein the first compliance boundary attribute defines access to the data at the first layer;
    apply the second compliance boundary to a second data platform in the cloud environment and the compliance work product container; and
    map a second compliance boundary attribute to the compliance administrator authorized to use the compliance tool and the account associated with the data, wherein the second compliance boundary attribute defines access to the data at the second layer.

10. The system of claim 9, wherein the first compliance boundary defines a geographical location compliance boundary.

11. The system of claim 9, wherein the first data platform includes at least one of a private data location and a shared data location.

12. The system of claim 9, wherein the compliance tool is extensible across a plurality of data locations in the cloud environment.

13. The system of claim 9, wherein the program instructions, when executed by the at least one processor, further cause the at least one processor to execute at least one rule that compares a compliance boundary attribute mapped to the compliance administrator with a compliance boundary attribute mapped to another account associated with the data.

14. A non-transitory computer-readable storage media comprising a set of instructions that cause a processor to at least:
    segregate data associated with a tenant using multiple layers, including a first layer defining a first compliance boundary and a second layer defining a second compliance boundary;
    applying the first compliance boundary to a first data platform in a cloud environment and a compliance container;
    mapping a first boundary attribute to a compliance administrator authorized to use a compliance tool and to an account associated with the data, wherein the first boundary attribute defines access to the data at the first layer;

applying the second compliance boundary to a second data platform in the cloud environment and the compliance container; and mapping a second boundary attribute to the compliance administrator and the account associated with the data, wherein the second boundary attribute defines access to the data at the second layer.

15. The non-transitory computer-readable storage media of claim 14, wherein the first compliance boundary defines a geographical location compliance boundary.

16. The non-transitory computer-readable storage media of claim 14, wherein the second compliance boundary defines a group compliance boundary.

17. The non-transitory computer-readable storage media of claim 14, wherein the first data platform includes at least one of a private data location and a shared data location.

18. The non-transitory computer-readable storage media of claim 14, wherein the compliance container includes an electronic discovery case.

19. The non-transitory computer-readable storage media of claim 14, wherein the compliance tool is extensible across a plurality of data locations.

20. The non-transitory computer-readable storage media of claim 14, wherein the compliance tool is an electronic discovery tool.

* * * * *